United States Patent [19]

Akesson

[11] Patent Number: 4,886,676
[45] Date of Patent: Dec. 12, 1989

[54] UTILIZATION OF FISH WASTE

[75] Inventor: Yngve Akesson, Hälsingborg, Sweden

[73] Assignee: Nestec S.A., Vevey, Switzerland

[21] Appl. No.: 606,598

[22] Filed: May 3, 1984

[30] Foreign Application Priority Data

Mar. 2, 1984 [EP] European Pat. Off. ........ 84102259.3

[51] Int. Cl.$^4$ ....................... A22C 25/00; A23L 1/325
[52] U.S. Cl. .................................... 426/289; 426/295; 426/643; 426/518; 426/524
[58] Field of Search ............... 426/518, 524, 643, 513, 426/100, 92, 89, 289, 295, 646

[56] References Cited

U.S. PATENT DOCUMENTS

| | | | |
|---|---|---|---|
| 3,709,699 | 1/1973 | Hartman et al. | 426/297 |
| 3,897,573 | 7/1975 | Kelly | 426/643 |
| 4,456,624 | 6/1984 | Glantz et al. | 426/295 |

FOREIGN PATENT DOCUMENTS 2180447 11/1973 France .
1157517 7/1969 United Kingdom .

*Primary Examiner*—Marianne Cintins
*Attorney, Agent, or Firm*—Vogt & O'Donnell

[57] ABSTRACT

A frozen fish product is prepared by sawing pieces of frozen fish to produce smaller pieces of frozen fish and which also produces sawdust. The sawdust is collected and pumped under a pressure of at least 30 bars and sprayed onto the surface of the smaller pieces of frozen fish.

5 Claims, 1 Drawing Sheet

UTILIZATION OF FISH WASTE

BACKGROUND OF THE INVENTION

The present invention relates to a process for the utilisation of fish waste, more particularly to the recovery of the sawdust resulting from sawing large frozen fish blocks into smaller pieces and its reincorporation onto the frozen cut pieces.

In the production of frozen fish products such as fish fingers or fish portions the fish, as soon as possible after being caught, is gutted, filleted into large pieces which are combined into blocks and the blocks themselves are immediately deep frozen. The frozen blocks, which are very hard, are later sawn into smaller pieces, for instance, by band saws or circular saws and this causes the formation of sawdust, the amount obtained being dependent on the original block size and the dimension of the final product. If this sawdust is wasted, the economy of the process is reduced and thus it is desirable to utilise as much of this high quality material as possible. It has been proposed to recover this sawdust and convert it into other products, such as patties, fillets or pieces for frying as described in British Patent No. 1,157,517, or fish croquettes as described in French Patent No. 2.180.447. However, it would be most expedient if this sawdust were reincorporated on to the cut pieces of frozen fish. Previous attempts have only succeeded in reincorporating about 50% of the saw dust on the cut pieces of frozen fish and the sawdust was not distributed evenly on the fish pieces.

SUMMARY OF THE INVENTION

We have now developed a method in which at least 80% of the sawdust can be recovered and reincorporated more evenly on the cut pieces of frozen fish.

According to the present invention, there is provided a method of producing a frozen fish product in which large blocks of frozen fish are sawn into smaller pieces characterised in that the sawdust produced by the sawing process is pumped by high pressure pump to a sprayer from which it is sprayed and reincorporated on to the surface of the frozen sawn pieces.

DETAILED DESCRIPTION OF THE INVENTION

On a conventional frozen fish processing line, the large frozen blocks which are to be divided into smaller pieces are usually rectangular in shape generally having the approximate dimensions of 500 mm length, 300 mm breadth and 60 mm thickness and the present invention is applicable to frozen blocks not only of these dimensions but also of other dimensions. Usually, the large frozen blocks are fed on to a conveyor where they are divided by means of band saws e.g., multiband saws, with up to six blades, or circular saws. Typically, they are first sawn into bars by vertical cuts transversely to the direction of travel, and then by horizontal cuts into thin slabs usually of about 10 to 15 mm thickness from which the final frozen fish product is produced by further sawing. Conventionally, these slabs are sawn by vertical cuts parallel to the direction of travel to produce fish fingers or fish sticks with their characteristic rectangular shape. The process of this invention may be used to recover the sawdust produced from the frozen blocks not only by the above sawing procedures but also by any other suitable sawing method.

In the present invention, the high pressure pump preferably collects substantially all the sawdust produced on the processing line.

The pump is conveniently an air motor driven pump, preferably of the piston type. The pump should develop a pressure of at least 30 bars, preferably at least 40 bars and especially from 50 to 70 bars but higher pressures are possible.

The sprayer is connected to the outlet of the pump, for instance by means of a pipe, and is positioned above the frozen sawn pieces so that the sawdust may be sprayed in a thin layer over the surface of the frozen sawn pieces, for example, as they travel along the conveyor. The sprayer may be fitted with one or more nozzles. Since the nozzles may become blocked with large particles of sawdust, the sprayer advantageously comprises a special head fitted with two nozzles which spray alternately so that while one nozzle is spraying sawdust the non-spraying nozzle is cleaned by means of compressed air being blown through it. For example, the nozzles may be fixed at an angle of approximately 90° C. to one another but are rotatable through this angle in a reciprocal manner so that each nozzle may alternately be brought into the spraying position while compressed air is simultaneously blown through the non-spraying nozzle, thus avoiding interruption of the spraying operation.

After spraying, the reincorporated sawdust adheres to the frozen sawn fish pieces as a very even thin layer and by the process of this invention at least 80% of the sawdust produced is recovered.

BRIEF DESCRIPTION OF THE DRAWING

The present invention is further illustrated by way of example with reference to the accompanying drawing in which.

DETAILED DESCRIPTION OF THE DRAWING

Figure 1:
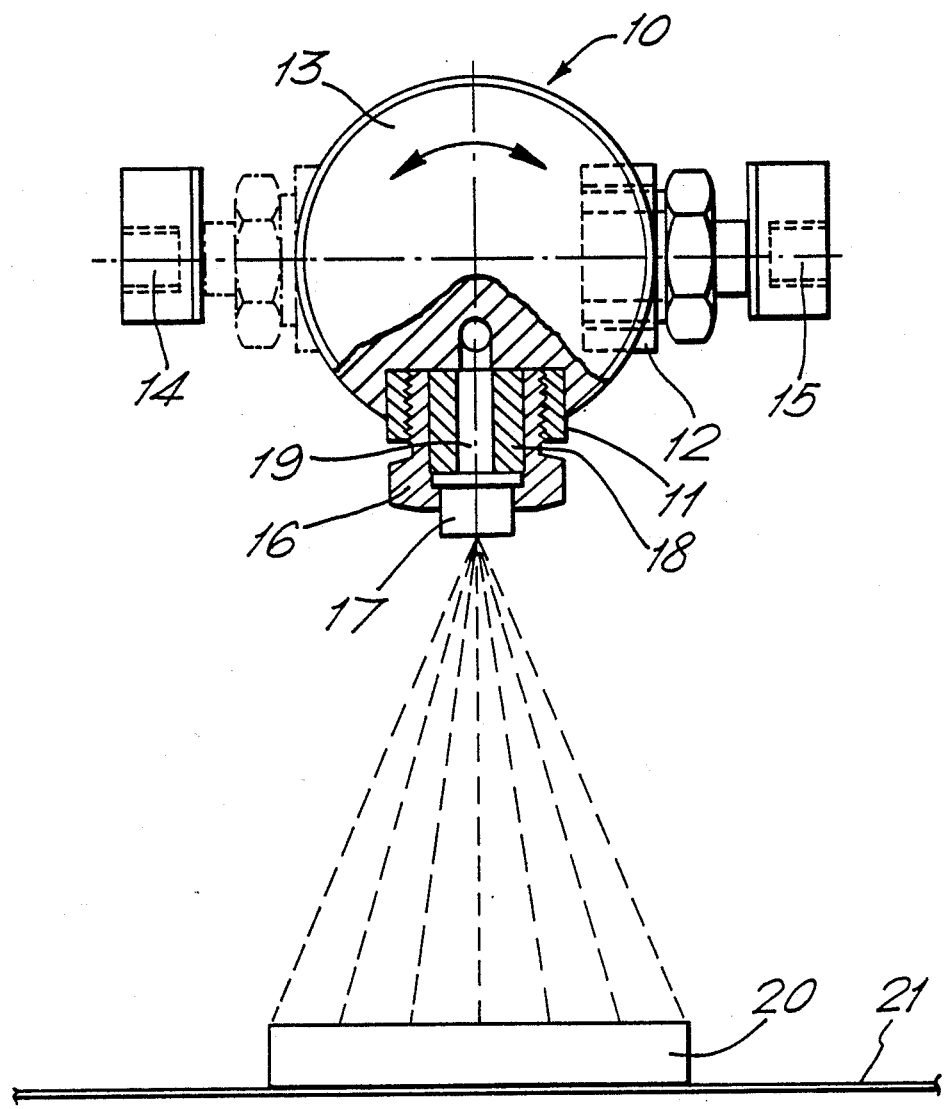
FIG. 1 is a diagrammatic view, partly in section to show the operation of a spraying head provided with two nozzles.

In the drawing, the spray head 10 comprises nozzles 11, 12 fixed at an angle of 90° C. to one anofhher on a rotatable axle 13 which can move reciprocally as indicated by the arrow, and channels 14 and 15, attached to suitable framework (not shown), for the passage of compressed air. The nozzles comprise a nozzle holder 16, nozzle tip 17, gasket 18 and channel 19. In the drawing, nozzle 11 is positioned directly above a fish slab 20 resting on a conveyor belt 21.

In operation, sawdust is sprayed as indicated through channel 19 of nozzle 11 on to fish slab 20 resting on conveyor belt 21 while, simultaneously, compressed air is blown via channel 15 through channel 19 of nozzle 12. When sufficient sawdust has been sprayed on fish slab 20, the axle 13 rotates clockwise 90° C. to bring nozzle 12 into a position directly above another fish slab 20 which has been transported on the conveyor belt 21 and sawdust is then sprayed through channel 19 of nozzle 12 on to this fish slab while, simultaneously, compressed air is blown via channel 14 through channel 19 of nozzle 11. When sufficient sawdust has been sprayed on this fish slab, the axle 13 rotates anticlockwise 90° C. to bring nozzle 11 again into a position directly above another fish slab 20 which has been transported on the conveyor belt 21 and the process is repeated so that while sawdust is sprayed through one nozzle, compressed air is blown through the other nozzle to clean it.

I claim:

1. A method of producing a frozen fish product comprising the steps of sawing pieces of frozen fish to produce smaller pieces of frozen fish and sawdust, collecting sawdust from said sawing step, pumping the collected sawdust by means of a pump which develops a pressure of at least 30 bars to a sprayer, and spraying the collected sawdust onto the surface of said smaller pieces of frozen fish.

2. The method of claim 1 in which the sawing step produces first bars of frozen fish, then thin slabs and finally rectangular fish fingers, and substantially all of the sawdust produced in the sawing step is collected in said collecting step.

3. The method of claim 1 in which said collected sawdust is pumped at a pressure of from 30 to 70 bars in said pumping step.

4. The method of claim 1 in which the sprayer includes two nozzles and the collected sawdust is sprayed alternately through said nozzles in said spraying step, further comprising the step of cleaning said nozzles by blowing air through said nozzles alternately so that the air passes through one of said nozzles while the collected sawdust is sprayed through the other one of said nozzles.

5. A method of producing a frozen fish product comprising spraying fish sawdust under a pressure of at least 30 bars onto the surface of a frozen fish piece.

* * * * *